United States Patent [19]

Duck et al.

[11] Patent Number: 5,748,363
[45] Date of Patent: May 5, 1998

[54] WAVELENGTH DEPENDENT CROSSOVER SYSTEM FOR BI-DIRECTIONAL TRANSMISSION

[75] Inventors: Gary Stephan Duck, Nepean; Joseph Ip, Kanata, both of Canada

[73] Assignee: Fitel Inc., Nepean, Canada

[21] Appl. No.: 566,442

[22] Filed: Nov. 30, 1995

[51] Int. Cl.$^6$ .................... H01S 3/00; H04B 10/16; G02B 6/00
[52] U.S. Cl. .................... 359/341; 359/143; 359/174; 385/37
[58] Field of Search .................... 359/341, 143, 359/174; 385/1, 37

[56] References Cited

U.S. PATENT DOCUMENTS

| | | | |
|---|---|---|---|
| 4,041,389 | 8/1977 | Oades | 325/3 |
| 5,214,728 | 5/1993 | Shigematsu et al. | 359/152 |
| 5,231,529 | 7/1993 | Kaede | 359/124 |
| 5,280,549 | 1/1994 | Barnard et al. | 385/15 |
| 5,283,686 | 2/1994 | Huber | 359/341 |
| 5,400,418 | 3/1995 | Pearson et al. | 359/489 |
| 5,452,124 | 9/1995 | Baker | 359/341 |
| 5,532,864 | 7/1996 | Alexander et al. | 359/160 |
| 5,557,442 | 9/1996 | Huber | 359/161 |
| 5,572,357 | 11/1996 | Nakazato et al. | 359/341 |

FOREIGN PATENT DOCUMENTS

| | | |
|---|---|---|
| 3194518 | 8/1991 | Japan . |
| 062526 | 2/1992 | Japan . |
| 062527 | 2/1992 | Japan . |
| 062528 | 2/1992 | Japan . |
| 2161612 | 1/1996 | United Kingdom . |

OTHER PUBLICATIONS

Vander Plaats et al, OFC '95, vol. 8, Mar. 3, 1995, pp. 64–65, AN 5137561; Abst. only herewith.

*Primary Examiner*—Nelson Moskowitz
*Attorney, Agent, or Firm*—Neil Teitelbaum & Associates

[57] ABSTRACT

A device in accordance with the invention uses a novel combination of two four port optical circulators, Bragg optical fiber diffraction gratings and a single erbium-doped optical amplifier (EDFA) to implement at least dual wavelength bi-directional (single fiber) optical amplifier module. A system using an amplifier module in accordance with the invention, advantageously allows communication network managers to simultaneously reduce the cost of signal amplification hardware across a fiber optic network, increase fiber utilization, simplify field installation and maintenance operations, and maintain adherence to conventional protection philosophies such as "one system per fiber." Furthermore, the system is tolerant of unwanted effects from back reflections that may be present from a faulty optical connector or a fiber break at either end.

12 Claims, 12 Drawing Sheets

5,748,363

WAVELENGTH DEPENDENT CROSSOVER SYSTEM FOR BI-DIRECTIONAL TRANSMISSION

FIELD OF THE INVENTION

This invention relates generally to the transmission of signals through optical fibers. More specifically the invention utilizes multi-port optical circulators in combination with transmitting/reflecting optical elements such as Bragg optical fiber gratings and an amplifier, for bi-directional communications through a single optical fiber.

BACKGROUND OF THE INVENTION

Conventional Two-Fiber Transmission

FIG. 1 depicts a conventional two-fiber transmission link where blocks 101 and 102 can represent regeneration or central office sites. Connecting the two sites together is a fiber optic cable. Within the cable there are multiple strands of fiber 103, of which two have been shown. In this type of transmission system, communication from a transmitter (TX) at site A to a receiver (RX) at site B utilizes one signal wavelength ($\lambda 1$) and one strand of an optical cable. Communication in the opposite direction uses a different strand of the optical cable and the same, or different, wavelength ($\lambda 2$) to carry the signal.

Referring again to FIG. 1, sites A and B (101 and 102) can represent different site configurations. In one configuration, one terminal site might communicate directly to another terminal site in a complete end-to-end, communication system. Alternatively, FIG. 1 could represent a single link in a longer chain of transmission stations. In other words, sites A and B might be representative of a site C and a site D and a site E and so on, until a final site containing terminating transmission equipment is reached.

Depending upon the wavelength chosen for transmission, the strand of optical fiber 103 used may exhibit different attenuation characteristics which may limit the possible sparing of regenerator sites, e.g., sites A and B. Attenuation in a typical single-mode optical fiber is about 0.35 dB/kilometer at 1310 nanometer (nm) and about 0.25 dB/kilometer at 1550 nm. Thus, for systems operating at data rates of a few gigabits per second, regenerator sites could be spaced anywhere from about 35 to 45 kilometers when operating at 1310 nm and into the 70 to 80 kilometer range when operating at 1510 nm.

Wavelength-Division Multiplexer (WDM) Filters FIG. 2 depict a conventional narrow-band wavelength-division multiplexing communication system. Here, the term "narrow-band" is used to mean that more than one wavelength is utilized within the same transmission "window" of the optical fiber. For example, if the system is operating within a 1550 nm window, two signaling wavelengths of 1533 and 1557 nm might be used. For standard single mode fiber, the two main transmission "windows" of interest are 1310 nm and 1550 nm. Unlike the configuration shown in FIG. 1, communication between site A and site B in FIG. 2 is provided by a single strand of optical fiber 103. Bi-directional transmission is achieved through the utilization of wavelength-division multiplexing (WDM) filters, 201 and 203. (The devices 201 and 203 can be the same or slightly different devices, depending upon the manufacturing technique used to create them.) The purpose of WDM filters is to couple multiple wavelengths into (hereafter referred to as 'on') and out of (hereafter referred to as 'off') the transmission fiber. In the example shown, WDM filters 201 and 203 couple the two wavelengths 1557 and 1533 nm on and off a single fiber 103 of a fiber optic cable.

WDM Technology

There are several technologies that can be used to construct WDM filters. For example, etalon technology, defraction grading technology, fused biconic taper technology, and holographic filter technology. One technology that has proven to be widely useful in the telecommunications industry is dichroic filter technology. This technology offers wide channel passbands, flat channel passbands, low insertion loss, moderate isolation, low cost, high reliability and field ruggedness, high thermal stability, and moderate filter roll-off characteristics.

An illustrative example of a conventional three-port dichroic filter 300 is shown in FIG. 3. A dichroic filter is comprised of one or more layers of dielectric material coated onto a, for example, glass substrate 305 with lenses 310 to focus the incoming and outgoing optical signals. The choice of dielectric material, the number of dielectric layers coated onto the substrate, and the spacing of these layers are chosen to provide the appropriate transmissive and reflective properties for a given-target-wavelength. For example, if $\lambda 1$ is the target wavelength to be transmitted through the filter, the number and spacing of the dielectric layers on the substrate 305 would be chosen to provide (1) a specified passband tolerance around $\lambda 1$ and (2) the necessary isolation requirements for all other transmitted wavelengths, for example, a wavelength, $\lambda 2$, transmitted by a second transmitter.

The dichroic, or WDM, filter is constructed by placing self-focusing lenses, such as "SELFOC" lenses 310, on either side of the dielectric substrate 305. "SELFOC" lens 310 focuses incoming light ($\lambda 1$ and $\lambda 2$) to a particular location on the dielectric substrate.

Attached to the "SELFOC" lenses through an adhesive bonding process are, typically, single-mode optical fibers. For convenience, the locations at which optical fibers attach to the "SELFOC" lenses 310 are called ports: port 1 320, port 2 325, and port 3 330. Connected to the ports are optical fibers 335, 340, and 345 respectively.

For example, all of the light (comprised of $\lambda 1$ and $\lambda 2$) passing through fiber 335 connected to port 1 320 is focused by lens 310 to a single location on the dielectric substrate 305.

Since the substrate is coated to pass wavelengths around $\lambda 1$, virtually all of the light at $\lambda 1$ passes through the dielectric substrate 305 and, via the second "SELFOC" lens, is collimated into port 3 330, and passes away from the filter on optical fiber 345. Any other wavelength incident on the filter through port 1 320 (e.g., light of wavelength $\lambda 2$) is reflected off the multilayer substrate, focused back through the first "SELFOC" lens to port 2 325, and passes away from the filter on optical fiber 340. Likewise, the filter performs the same function for light traveling in the opposite direction. This technology could be used to, for instance, implement WDM filter 201 shown in FIG. 2.

FIG. 4 is a variation of the system shown in FIG. 1, a two-fiber design where one wavelength ($\lambda 1$) is transmitted on one fiber in one direction, and another (or possibly the same) wavelength ($\lambda 2$) is transmitted on the other fiber in the opposite direction. Erbium-doped fiber amplifiers (EDFAs) can be deployed along such a link in multiple locations: immediately following the transmitter (TX), making them post-amplifiers; immediately preceding a receiver (RX), making them pre-amplifiers; or between a transmitter and receiver, as shown in FIG. 4, making them line-amplifiers. Commercially available EDFA devices only operate in the 1550 nm window. Typically, in the line-amplifier configuration, regenerator spacing can be almost doubled, from approximately 70 to 80 kilometers to approximately 140 to 160 kilometers. (This analysis assumes typical filter attenuation and that at 80 kilometers the system is attenuation limited and not dispersion limited for distances less than 160 kilometers). Hence, if the cost of two EDFAs is less than the cost of a conventional fiber optics transmission system regenerator, the two EDFAs 401 and 403 can be used to reduce equipment deployment costs when constructing a transmission network such as that shown in FIG. 4.

Erbium-Doped Fiber Amplifier (EDFA) Technology

FIG. 5 shows a conventional design for an EDFA such as that shown in FIG. 4, blocks 401 and 403. In a typical dual-pumped amplifier there are either two or three optical isolators 501, two WDM filters 505 and 511, two laser pump sources 503 and 509, and a length of erbium-doped single mode fiber 507. If the amplifier is single-pumped, one of the pump sources 503 or 509 is removed. If a pump source is removed, its corresponding WDM filter is likewise removed: if pump source 503 is removed, WDM filter 505 is also removed; if pump source 509 is removed, WDM filter 511 is also removed.

WDM filters perform the function of coupling the pump source laser wavelength into the erbium-doped fiber. Pump energy is used to elevate the erbium ions concentrated in the erbium-doped fiber to a higher-than-normal energy level. These ions will stay excited until they decay on their own accord or are stimulated to decay by the arrival of a signal wavelength photon arriving from the transmission link 103. It is through the process of "stimulated decay" that an optical signal is amplified in an EDFA.

Isolators function as one-way conduits for optical signals. In other words, isolator elements 501 allows an optical signal to pass in a single direction, e.g., from left to right, but not from right to left.

Consider the case where a signal photon enters the amplifier of FIG. 5 at the point labeled IN. The photon passes through isolator 501 and enters the WDM filter 505, where it is routed into the length of erbium-doped fiber 507. Both during and preceding the arrival of the signal photon, laser pumps 503 and 509 have been providing energy to the erbium-doped fiber via the WDMs 505 and 511, exciting the fiber's erbium ions. Upon entering the erbium fiber, the signal photon will cause decay of some of the excited erbium ions, releasing their energy in the form of (stimulated) photons. The original signal photon plus the stimulated photons then pass out of the WDM 511, through the output isolator 501, and back onto the transmission fiber 103.

Several aspects of amplifier design and utilization are well-known to those of ordinary skill. Of great importance in network applications is the configuration of the optical amplifier. If optical isolators are used internal to the amplifier, then they make the amplifier an inherently unidirectional device. In FIG. 5 for example, the isolators 501 prevent a signal from propagating from right-to-left (OUT toward IN). These isolators are important for eliminating the amplification of unwanted back reflections that could degrade system stability. Another characteristic that must be considered when deploying an amplifier is what signal wavelength to use in conjunction with the amplifier's pump (s) wavelength. Because amplifier gain is not perfectly flat for all incoming wavelengths (different wavelengths exhibit different gain characteristics), the precise wavelengths to use are a function of the gain variations of the different available pump wavelengths.

EDFA Based Amplifier Systems

Two prior art communication links utilizing EDFAs and conventional WDMs are shown in FIGS. 6 and 7. In FIG. 6 a single-fiber transmission link is shown with one EDFA 401 configured as a line amplifier. As previously stated, if the EDFA 401 of FIG. 6 were a typical amplifier (built as described in FIG. 5 for example) this communication link would not provide bi-directional transmission; transmission would occur from site A to site B, but not from site B to site A. (it is possible to build an optical amplifier without the optical isolators but this creates inherent instability problems that make it difficult to maintain a safe operating environment and is, therefore, not recommended by existing industry standards).

In FIG. 7 EDFA amplifiers 401 and 403 are deployed as post-amplifiers, immediately following the transmitters (TX) and immediately before the WDM filters 201 and 203. It is possible to obtain bi-directional transmission over the single fiber link 103 in this configuration. There are, however, at least two disadvantages to this implementation. First, in this design the high power signal leaving a transmitter is physically collocated with an optical receiver (RX). In such cases, care must be taken to avoid near-end optical loop backs. In other words, at site A 101 with a high power signal leaving EDFA 401, any signal reflection from the WDM filter 203 could return to site A's receiver and cause an optical feedback problem. The same is true of site B's configuration. Another drawback to this configuration is in the economics of deploying post amplifiers versus line amplifiers. (Line amplifiers provide a larger gain margin than do post amplifiers). If line amplifiers could be used to extend the distance between sites, while maintaining the ability to provide bi-directional transmission, the cost of the system's hardware could be significantly reduced.

Conventional unidirectional amplifier systems (e.g., FIG. 4) use two fibers per link; one fiber carrying data in one direction and the other fiber carrying data in the opposite direction. If two signal channels are needed in such a system, four fibers are required. Likewise, conventional bi-directional amplifier systems (e.g., FIG. 2) use one fiber per link. If two signal channels are needed in such a system, two fibers are required. The reduction in fiber count of a bi-directional WDM design could also be achieved in a unidirectional WDM design by employing multiple transmitters on a single fiber in one direction and multiple transmitters on a single fiber in the opposite direction. An example of the latter system design, using two transmitters and two receivers at each site, is depicted in FIG. 8. In this design, transmitter one ($TX_1$) and transmitter two ($TX_2$), located at site A 801 and operating at wavelength 1 and wavelength 2 respectively, are coupled onto a single fiber 103 through the WDM filter 203. Both of these wavelengths are amplified by the EDFA 401 during signal transmission. WDM filter 201, located before the two receivers $RX_1$, and $RX_2$, is used to separate the two wavelengths and route each signal to the correct receiver.

The design of FIG. 8 could be built using conventional EDFAs, including internal isolators, because only unidirectional transmission through the amplifiers are required. The primary disadvantage of this design lies in the difficulty of protecting such a system. With multiple systems on a single fiber, if that fiber is lost due to a cable cut or some other disaster, then multiple systems would be down at the same time. By convention, transmission systems employ a 1-by-N protection scheme, meaning that one backup system is used to protect multiple (N) transmission channels. If a single channel fails, that channel's traffic is rerouted to the backup channel and no traffic is lost. The failed channel is said to have been "switched to protect." In a 1-by-N scheme if multiple systems (transmitters or receivers) fail, only one system can switch to protect. In order to protect the configuration shown in FIG. 8 beyond a 1-by-1 system, multiple protect systems would be required, since there are multiple systems on a single fiber. This is a costly endeavor and one which the invention addresses.

Illustrative Systems

FIG. 9 depicts one configuration for a dual wavelength, bi-directional narrow-band WDM optical amplifier module, 901. Components used to construct the amplifier module 901 include: two WDMs, 201 and 203 (input and output ports of the amplifier module), and two EDFAs, 903 and 905, which can be either single-pumped or dual-pumped depending upon the communication system's power constraints/requirements. This line-amplifier configuration extends the regenerator spacing while providing bi-directional transmission utilizing a single-fiber strand of the cable facility 103.

It should be noted that the amplifier module 901 can be cascaded to extend even farther the distance between site A and site B. (The number of amplifiers that can be cascaded, between sites A and B, is limited by the dispersion characteristics of the transmission equipment deployed at sites A and B.)

Referring now to prior art FIG. 10, U.S. Pat. No. 5,452, 124 describes a bi-directional amplifier module design that can be constructed utilizing a single EDFA. In this configuration, bi-directional transmission over a single optical fiber is achieved using four WDM filters. All signal wavelengths must pass unidirectionally through the EDFA 401 due to the constraint of using optical isolators in the EDFA 401 (refer to FIG. 5). Therefore, the two transmission wavelengths traveling in opposite directions, must be broken apart and recombined through WDM filters to pass unidirectionally through the EDFA. Similarly, the two amplified wavelengths must be broken apart and recombined through WDM filters to continue propagating toward their respective receiver sites. WDM filter 203 is constructed to bandpass 1557 nm and WDM filter 201 is constructed to bandpass 1553 nm.

Assuming a typical 1550 nm EDFA operational band, then going through FIG. 10 in a left-to-right direction we see a 1557 nm signal is transmitted from site A 101, through the east WDM filter 203, and onto the fiber cable 103. As the signal enters the amplifier module it is separated by the west WDM filter 201. (Each WDM filter in FIG. 10 has its external connection points labeled either 33 or 57. Connections labeled 33 carry optical signals at the 1533 nm wavelength. Connections labeled 57 carry optical signals at the 1557 nm wavelength.) The signal then travels to the east WDM filter 203 where it is routed into the EDFA amplifier 401. Upon leaving the EDFA, the 1557 nm signal is routed by another west WDM filter 201 to the amplifier module's output east WDM filter 203 where it is placed onto the fiber optic transmission cable 103. Finally, the signal leaves the transmission cable 103, enters the west WDM filter 201 at site B 102, and is routed to that site's receiver equipment. Signals transmitted from site B, at 1533 nm, take a different path through the WDM filters 201 and 203 and EDFA 401 on their way to site A's receiver. An advantage of this prior art embodiment over the configuration described in the earlier prior art of FIG. 9 is that only a single erbium-doped fiber amplifier is required. Because multiple wavelengths are being amplified by a single amplifier, it is sometimes preferable that the EDFA 401 in FIG. 10 use a dual-pumped amplifier rather than a single-pumped amplifier. The additional gain provided by a dual-pumped EDFA could compensate for the signal strength lost by virtue of passing it through a number of additional elements.

As noted above, bi-directional amplification is important in adhering to the protection philosophy of a single fiber failure only resulting in outage to a single transmission system. Given this constraint, there are two basic ways to provide bi-directional amplification. One method, shown in FIG. 9, utilizes two separate EDFA sources-one EDFA to amplify one signal in one direction and the other EDFA to amplify another signal in the opposite direction. The system of FIG. 10, has the advantage of using only a single amplifier, but requires four WDM filters in order to route the different (signal) wavelengths so that they pass unidirectionally through the single amplifier.

In an attempt to overcome the limitations of the aforementioned prior art systems, U.S. Pat. No. 5,452,124 issued Sep. 19, 1995 in the name of Baker, discloses a system that utilizes a four-port wavelength-division multiplexing (WDM) filter and a single erbium-doped optical amplifier (EDFA) to implement a dual wavelength bi-directional (single fiber) optical amplifier module.

The optical amplifier module described by Baker conveniently provides bi-directional signal transmission using a single EDFA and a single four-port WDM.

Prior art FIG. 11 depicts Baker's system incorporating a single fiber bi-directional amplifier module 1100. At site A, a WDM 203 is used to combine two wavelengths of light ($\lambda 1$ and $\lambda 2$) onto a single fiber 103. The transmitter at site A is transmitting light at wavelength $\lambda 1$. The receiver at site A is receiving light from site B at wavelength $\lambda 2$. Hence, $\lambda 1$ travels from site A to site B or from west to east on fiber 103, and $\lambda 2$ travels from site B to site A in an east to west direction on the fiber 103.

Incorporated within the amplifier module 1100 is a four-port WDM filter 1105. As shown in FIG. 11, port 1 connects to the west fiber link 103, port 2 connects to the east fiber link 103, port 3 is connected to the input of the amplifier module's EDFA via an optical fiber link 1110, and port 4 is connected to the output of the amplifier module's EDFA via an optical fiber link 1110. Site A's 101 WDM filter 203 is a dichroic filter designed to pass a center wavelength $\lambda 2$. Site B's 102 WDM filter 201 is also a dichroic filter, but is designed to pass a center wavelength $\lambda 1$. The amplifier module's WDM filter 1105 can be constructed from either WDM filter 201 or 203 with the addition of an extra port. The functionality of a four-port WDM will be described below.

FIG. 12 of the Baker patent depicts a four-port WDM filter 1105. West fiber link 103, coming from site A, is connected to port 1 1200. East fiber link 103, coming from site B, is connected to port 2 1205. In this example, let WDM filter 1100 (i.e., the multilayer dichroic substrate 305) have a designed pass-center-wavelength of $\lambda 2$. This means that signals having a wavelength $\lambda 2$ will pass through the WDM filter (i.e., the multilayer dielectric substrate) while signals of all other wavelengths will be reflected.

Light traveling into port 1 1200 on "west" fiber 103 having wavelength $\lambda 1$ will, after being focused onto the filter's substrate by "west" lens 310, be reflected back to port 3 1210 through west lens 310 (recall, only light having a wavelength of $\lambda 2$ will pass through the filter's substrate). In a similar manner, light traveling into port 2 1205 on "east" fiber 103 having wavelength $\lambda 2$ will, after being focused onto the filter's substrate by "east" lens 310, be passed through the filter's substrate material 305, recollimated by "west" lens 310, and collected at port 3 1210. Hence, port 3

1210 collects light having both wavelengths λ1 and λ2. As shown, light leaving port 3 1210 is routed via fiber link 1110 to the input port of a conventional EDFA 401. (Fiber links 1110 can be conventional single-mode optical fiber.) In this manner light traveling from site A to site B as well as light traveling in the opposite direction, from site B to site A, is passed unidirectionally through the EDFA 401.

After amplification, both wavelengths λ1 and λ2 exit the amplifier 401 and are routed to port 4 1215 where they are focused by the "east" lens 310 onto the filter's substrate 305. Light of wavelength λ1 is reflected back through the "east" lens into port 2 1205 where it exits the filter on its way to site B. Light of wavelength λ2 is passed through the substrate and focused by the "west" lens 310 into port 1 1200 where it exits the filter on its way to site A.

Although the Baker patent appears to adequately provide its intended function, there is a need for unidirectional amplification for bi-directional transmission that is particularly tolerant of unwanted back-reflections from any high reflecting device, poor or faulty connectors and the like.

Furthermore, there is a need for a device that offers the ability to transmit a first narrow range of wavelengths in a first direction, and a second narrow range of wavelengths in an opposite direction, wherein the transition between the first and second range of wavelengths is extremely abrupt.

Conventional dichroic interference filters such as bandpass filters described heretofore designed to allow wavelengths within a predetermined range of the desired passband to be transmitted, while a range of wavelengths on either side of the pass band are highly reflected, are in some instances inadequate in their response. Ideally a bandpass filter should be square in its response; thus, the transition from the rejection regions to the passband should be as rapid as possible, or expressed differently, the slope or transition region should be as steep as possible, while obtaining a pass band region that is uniform having little or no ripple.

In a preferred embodiment of this invention this inherent problems associated with using conventional WDM interference dichroic filters is somewhat remedied by utilizing Bragg optical fiber gratings. For example dichroic filters offer reasonably high isolation on transmission but, lower and often unacceptable levels of isolation on reflection. In an amplification system such as Baker's, this can critically effect the performance of the device, where unwanted non-isolated signals become amplified. By using Bragg diffraction gratings, that have substantially symmetrically high isolation in reflection and in transmission, these potential problems are substantially obviated.

Furthermore, a unique design having two four-port optical circulators in combination with these Bragg optical fiber gratings provide a means of steering oppositely propagating optical signals through a single unidirectional device such as an EDFA, and ensure that any unwanted back reflections are minimized by being substantially extinguished.

In addition to these advantages, the arrangement of this invention offers a further advantage. It is known and practiced in the art, to provide an isolator at an input and an output end of an optical amplifier. The device in accordance with this invention, does not require this additional isolation as sufficient isolation is provided by the two optical circulators that the amplifier is coupled to.

SUMMARY OF THE INVENTION

In accordance with the invention there is provided, an amplifying device comprising;

a first circulator having at least 4 ports;

a second circulator having at least 4 ports;

first wavelength selective means disposed between a first and a second port of the first and second circulator respectively;

second wavelength selective means disposed between a third and fourth port of the first and second circulator respectively, the first and second wavelength selective means substantially transmitting light of a first wavelength and substantially reflecting light of a second predetermined wavelength;

amplifying means, disposed between two other ports of the first and second circulators, said amplifying means being disposed along a path that is provided to carry light of the first and second wavelength, the first and second circulators being arranged to receive two wavelengths of oppositely propagating light of at least the first and second wavelength and in cooperation with the first and second wavelength selective means, direct the first and second oppositely propagating light in a same direction through the amplifying means.

In accordance with the invention there is provided, a device for changing a characteristic of a first optical signal having a first wavelength, that is propagating in a first direction in a first optical fiber and for changing a characteristic of a second optical signal, having a second wavelength that is propagating in a second direction along a second optical fiber, comprising:

a first multi-port optical circulator coupled to the first optical fiber to receive the first optical signal;

a second multi-port optical circulator coupled to the second optical fiber to receive the second optical signal;

wavelength selective means for substantially transmitting optical signals of the first wavelength and for substantially reflecting signals of the second wavelength, said wavelength selective means disposed between the first and second optical circulators;

means for changing a characteristic of an optical signal passing therethough, said means disposed between and for communicating with said first and second optical circulator, the first and second multi-port optical circulators in combination with the wavelength selective means, cooperating to steer the first optical signal so that a characteristic of the first optical signal is changed, and for later steering the first incoming signal onto the second optical fiber, and for steering a second oppositely propagating optical signal so that a same characteristic of the second optical signal is changed, and for later steering the second signal onto the first optical fiber.

In accordance with another aspect of the invention there is provided, a method of amplifying a first optical signal having a first wavelength, propagating in a first direction and amplifying a second optical signal, having a second wavelength propagating in a second direction utilizing a same optical amplifier, comprising the steps of:

(a) routing the first and second optical signals to an input port of the optical amplifier through a first router;

(b) amplifying the first and second optical signals;

(c) rerouting the first optical signal in the first direction through a second router; and (d) rerouting the second optical signal in the second direction through the second router.

In accordance with another aspect of the invention there is provided, an optical amplifier arrangement for amplifying a first optical signal having a first wavelength, propagating in a first direction and for amplifying a second optical signal, having a second wavelength propagating in a second direction, comprising:

means for directing the first and second optical signals in predetermined and opposite directions in dependence upon their wavelength.

amplifing means for amplifying the first and second optical signals;

a first router coupled to and in combination with said means for directing for routing the first and second optical signals to an input port of the optical amplifier; and, a second router coupled to and in combination with said means for directing the first and second optical signals for routing the first optical signal in the first direction and for routing the second optical signal in the second direction.

In accordance with the invention, there is further provided a device for changing a characteristic of a first optical signal having a first wavelength, that is propagating in a first direction in a first optical fiber and for changing a same characteristic of a second optical signal, having a second wavelength that is propagating in a second direction along a second optical fiber, comprising:

a first multi-port optical circulator coupled to the first optical fiber to receive the first optical signal;

a second multi-port optical circulator coupled to the second optical fiber to receive the second optical signal;

wavelength selective means for substantially transmitting optical signals of the first wavelength and for substantially reflecting signals of the second wavelength, said wavelength selective means disposed between the first and second optical circulators;

terminals for connection to means for changing a characteristic of an optical signal passing therethough, said means when connected to said terminals, being disposed between and for communicating with said first and second optical circulator, the first and second multi-port optical circulators in combination with the wavelength selective means, cooperating to steer the first optical signal so that a characteristic of the first optical signal is changed, and for later steering the first incoming signal onto the second optical fiber, and for steering a second oppositely propagating optical signal so that a same characteristic of the second optical signal is changed, and for later steering the second signal onto the first optical fiber.

In accordance with another aspect of the invention device is provided for use with an amplifier comprising;

a first circulator having at least 4 ports;

a second circulator having at least 4 ports;

first wavelength selective means disposed between a first and a second port of the first and second circulator respectively;

second wavelength selective means disposed between a third and fourth port of the first and second circulator respectively, the first and second wavelength selective means substantially transmitting light of a first wavelength and substantially reflecting light of a second predetermined wavelength;

terminals disposed between two other ports of the first and second circulators for connection to amplifying means, said amplifying means when connected to said terminals being disposed along a path that is provided to carry light of the first and second wavelength, the first and second circulators being arranged to receive two wavelengths of oppositely propagating light of at least the first and second wavelength and in cooperation with the first and second wavelength selective means, direct the first and second oppositely propagating light in a same direction through the amplifying means.

BRIEF DESCRIPTION OF THE DRAWINGS

Exemplary embodiments of the invention will now be described in conjunction with some of the following figures.

DETAILED DESCRIPTION OF A SPECIFIC EMBODIMENT

One illustrative embodiment of the invention is described below as it might be implemented using a Bragg optical fiber grating and EDFA technology. In the interest of clarity, not all features of an actual implementation are described in this specification. It will of course be appreciated that in the development of any such actual implementation (as in any hardware development project), numerous implementation-specific decisions must be made to achieve the developers' specific goals and subgoals, such as compliance with system-and business-related constraints, which will vary from one implementation to another. Moreover, it will be appreciated that such a development effort might be complex and time-consuming, but would nevertheless be a routine undertaking of device engineering for those of ordinary skill having the benefit of this disclosure.

INTRODUCTION

Single mode optical fiber communication systems have matured in a remarkably short time since the proposal by Kao and Hockham for using dielectric waveguides as a low-loss transmission medium. The application of photosensitivity of germanium doped optical fibers is another milestone. Photosensitivity of optical fibers remained dormant for several years after it was first reported by Hill et al. in a paper entitled "Photosensitivity in optical waveguides: Application to reflection filter fabrication," published in Appl. Phys. Lett., vol. 32, no. 10, 647, (1978). Since that time optical fiber reflection gratings have become more prevalent. A history of the development and description relating to the current state of the art is found in a paper by Raman Kashyap entitled Photosensitive Optical Fibers: Devices and Applications, published in Optical Fiber Technology 1, 17–34 (1994).

Chirped Bragg optical fiber gratings are now becoming available and have characteristics that are well suited to WDM applications. For example, it possible to design and write a Bragg grating into an optical fiber that is substantially square in response and achieving desired transmissive and reflective characteristics; thus, the transition from the rejection regions to the passband are as rapid as possible obtaining a pass band region that is uniform having little or no ripple. An embodiment of the invention described hereafter utilizes chirped Bragg optical fiber gratings.

Figure 1:
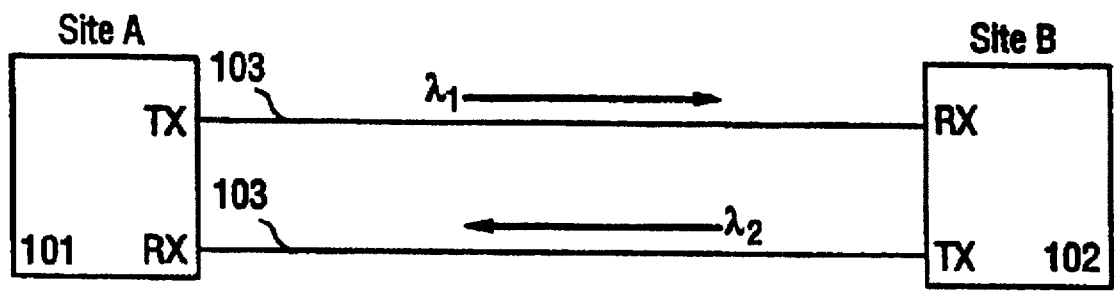
FIGS. 1, 2 and 4 through 8 are block-diagram representations of some conventional fiber optic communication systems as discussed in more detail above.
Figure 2:
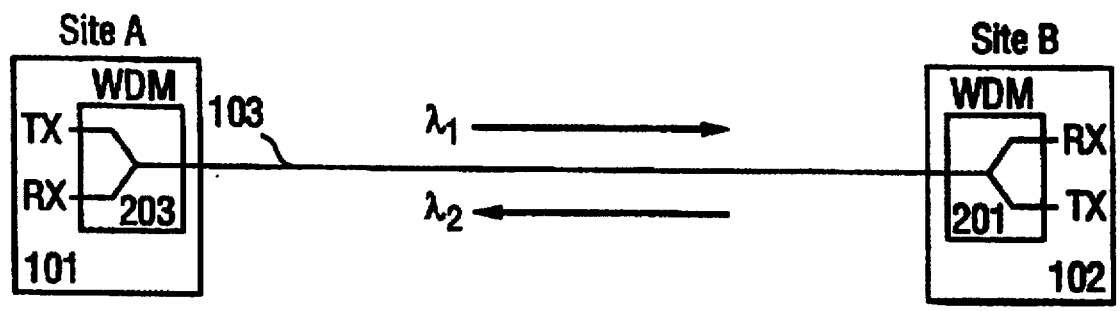
Figure 3:
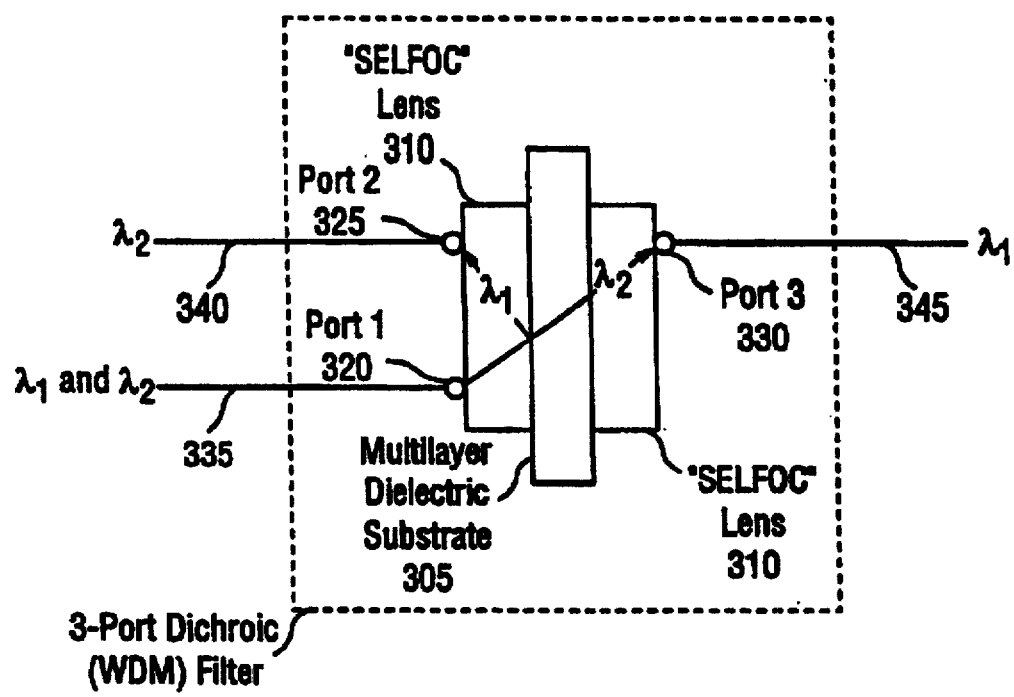
FIG. 3 is a block diagram representation of a conventional three-port wavelength-division multiplexer filter.
Figure 4:
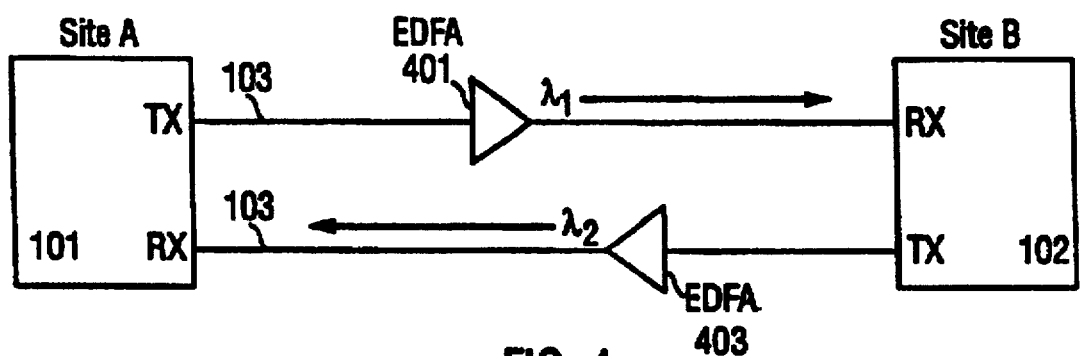
Figure 5:
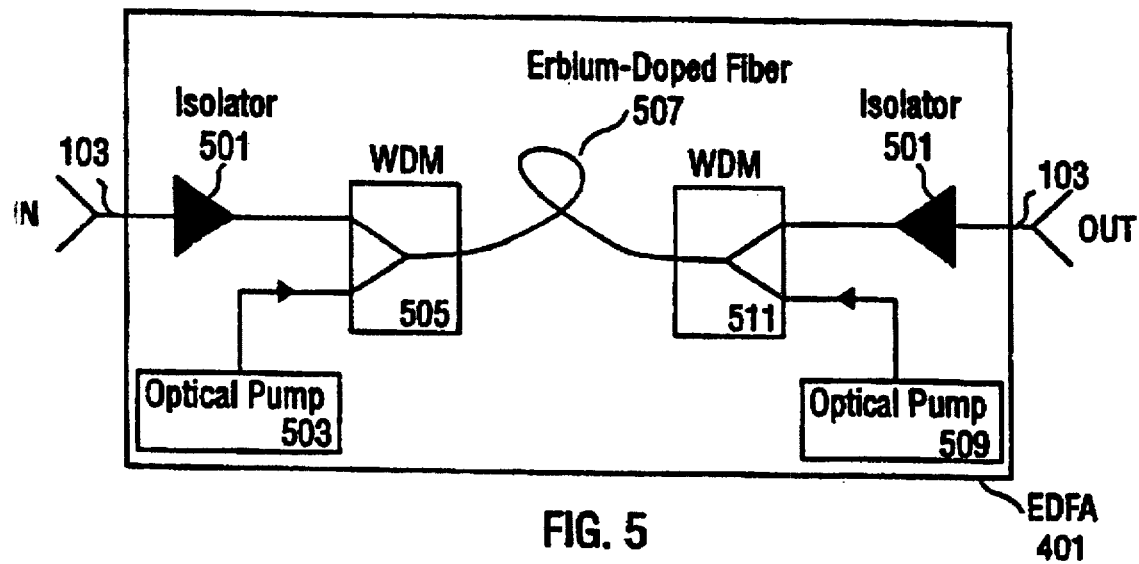
Figure 6:
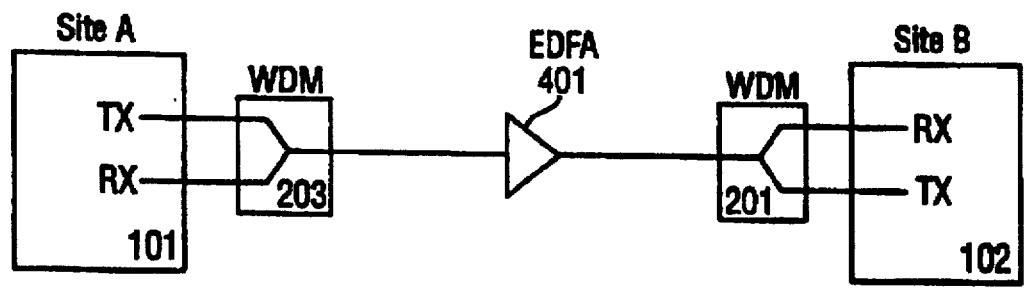
Figure 7:
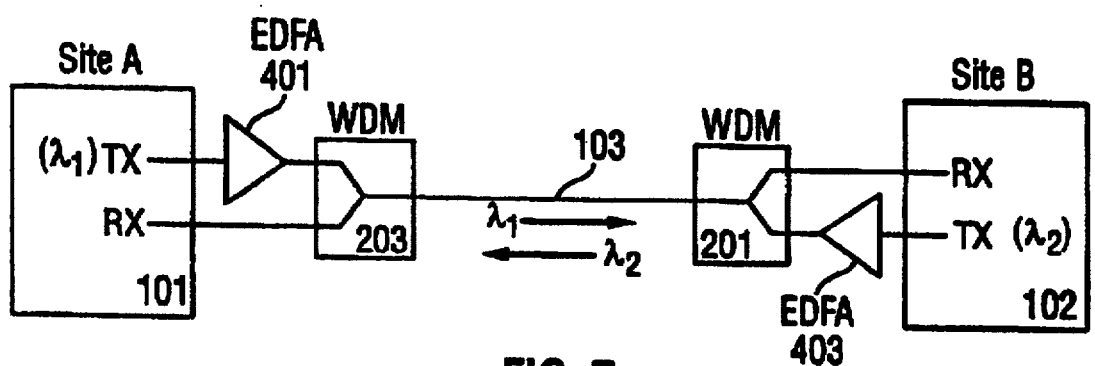
Figure 8:
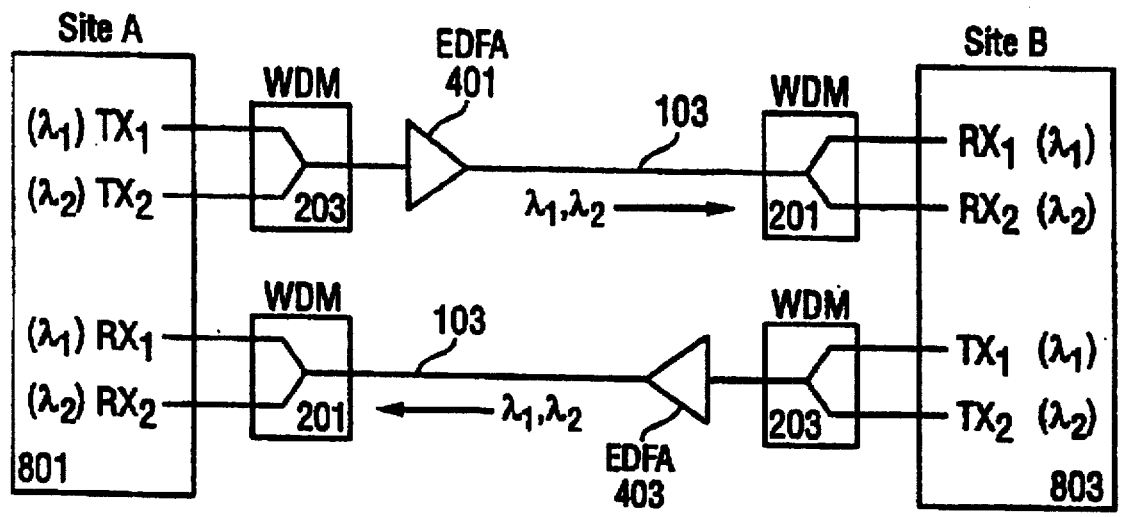
Figure 9:
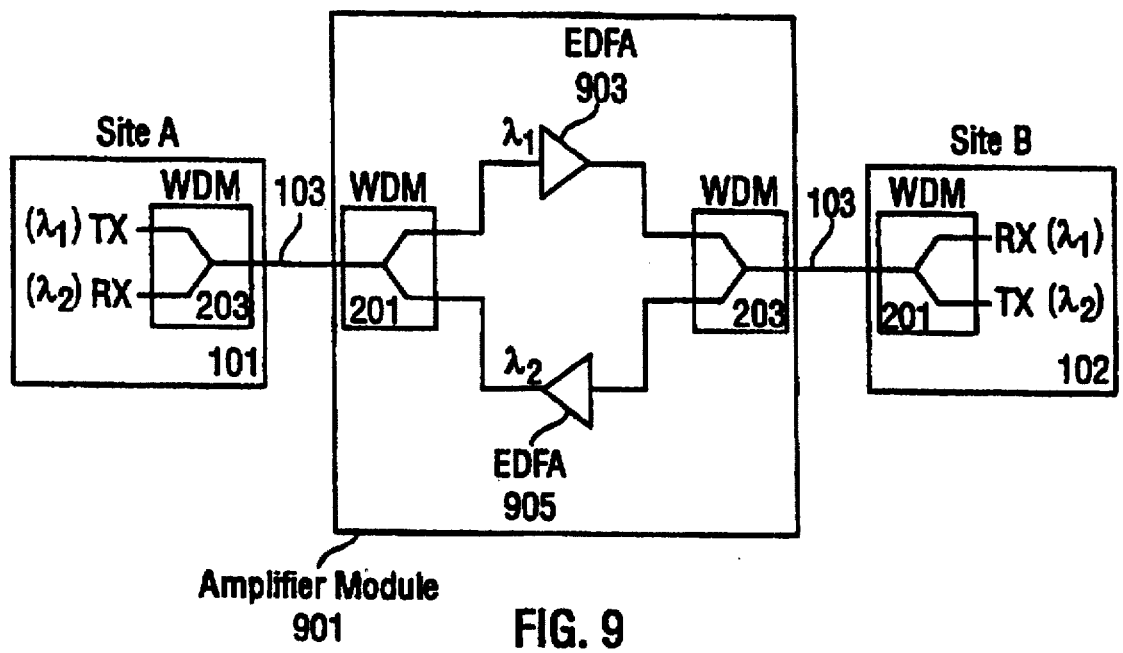
FIG. 9 is a block diagram representation of a prior art single-module amplifier for bi-directional transmission employing wavelength-division multiplexing and erbium-doped fiber amplifier technology.
Figure 10:
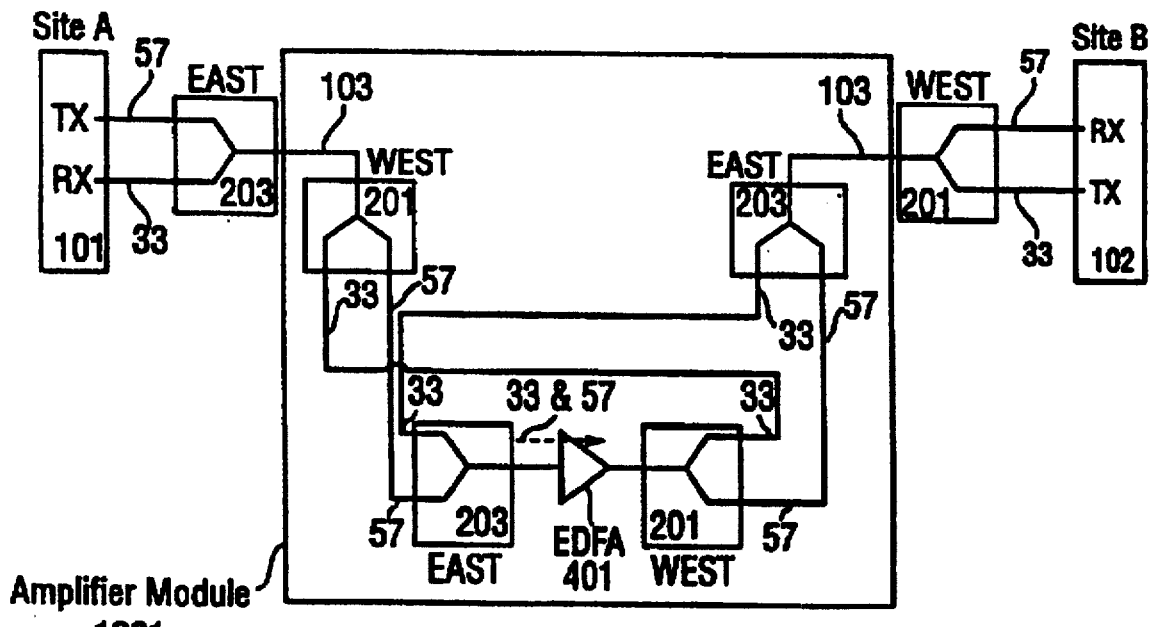
FIG. 10 is a block diagram representation of a prior art bi-directional optical amplifier module comprising a single erbium-doped fiber amplifier and four conventional three-port wavelength-division multiplexers.
Figure 11:
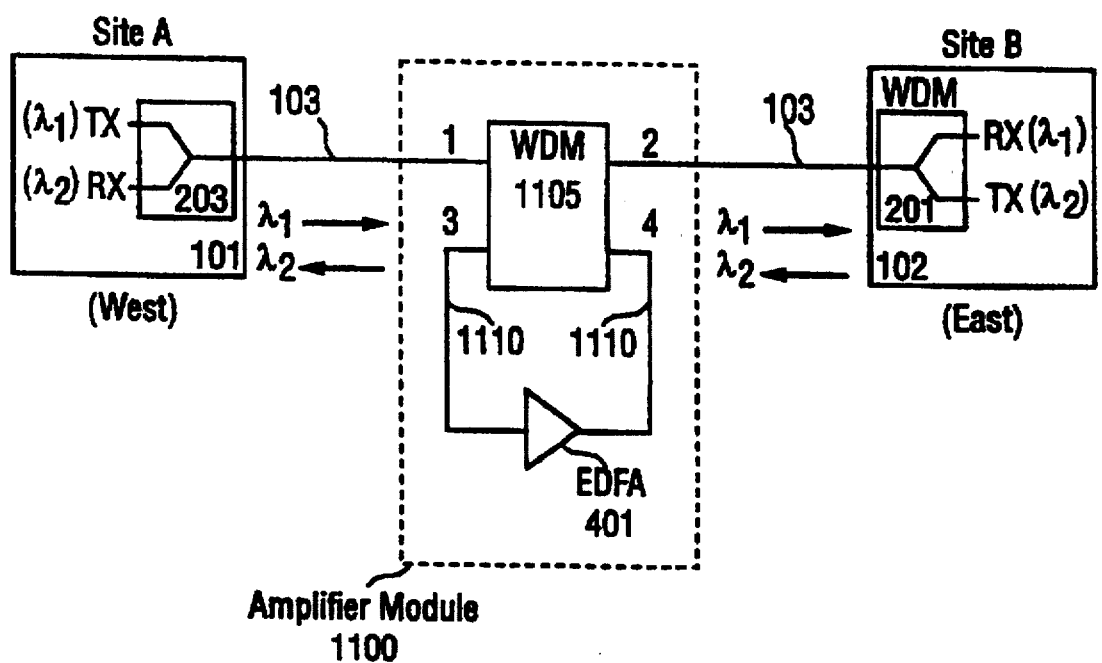
FIG. 11 is a block diagram representation of a prior system of a bi-directional amplifier module comprising a single four-port wavelength-division multiplexer filter and a single erbium-doped fiber amplifier.
Figure 12:
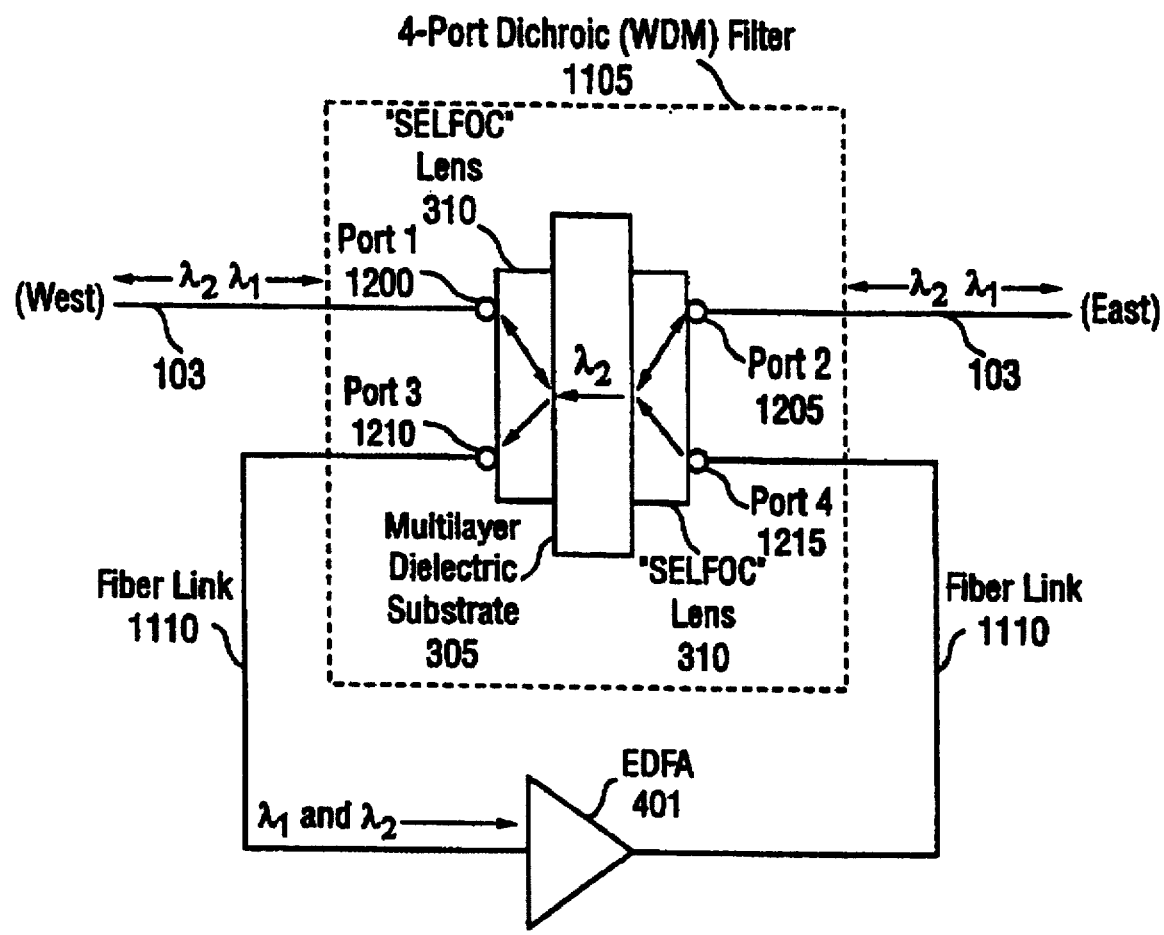
FIG. 12 is an expanded block diagram of the prior art bi-directional communication system of FIG. 11.
Figure 13:
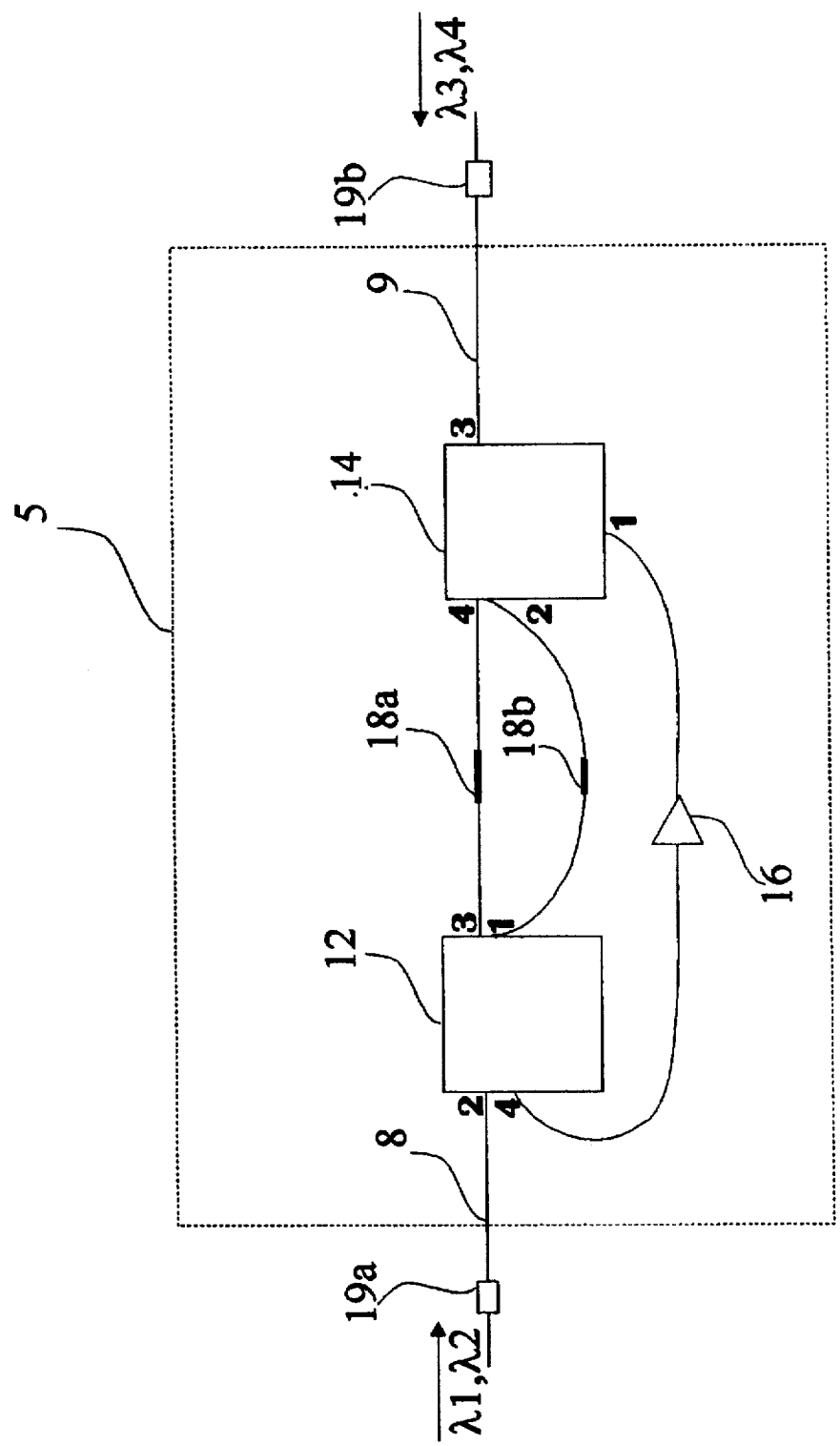
FIG. 13 is a block diagram of a bi-directional amplifier module comprising a single erbium-doped fiber amplifier, in accordance with this invention.
Figure 14:
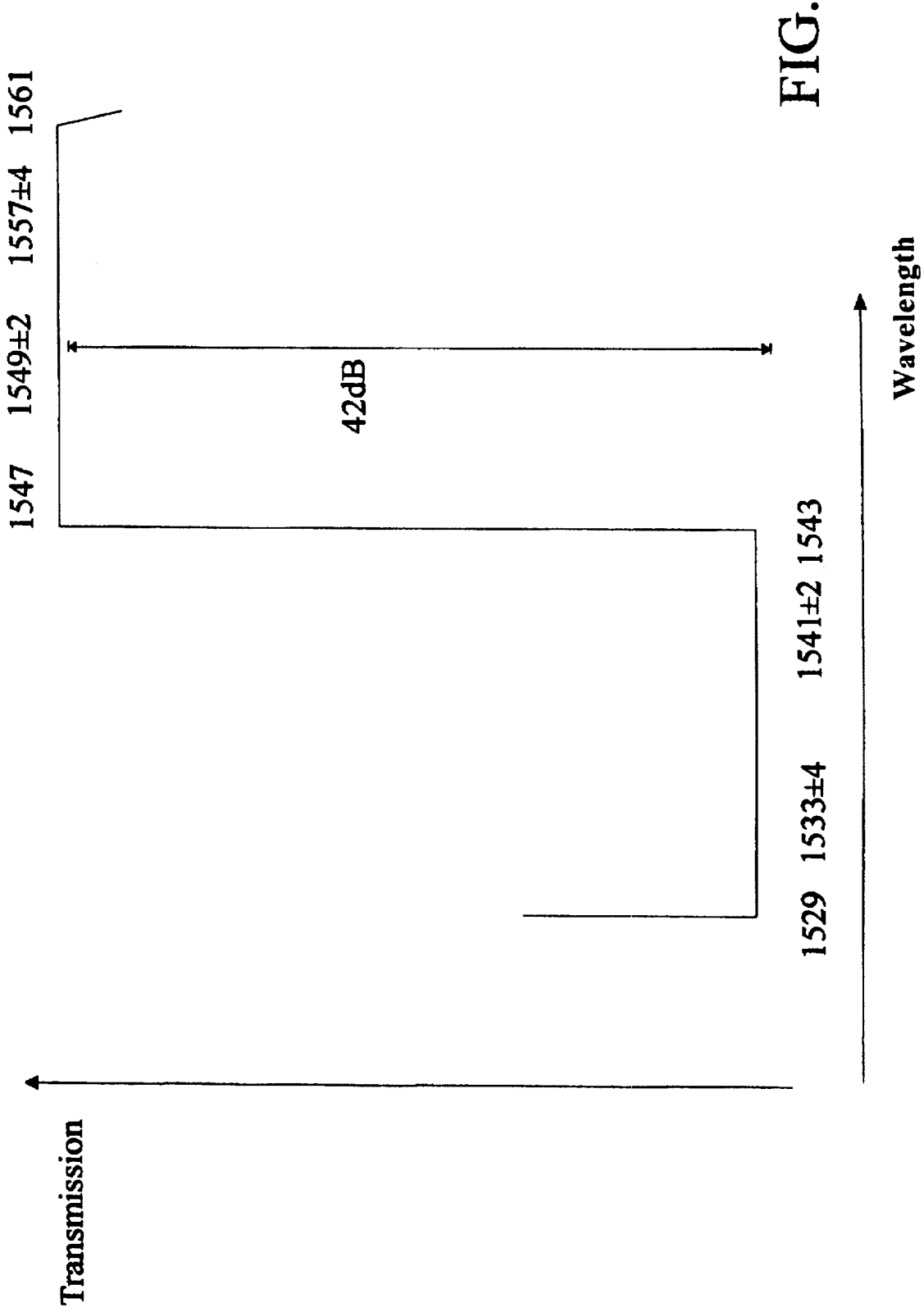
FIG. 14 is a plot of the transmissive/reflective characteristics of a first Bragg optical fiber grating.

Referring now to FIGS. 13 and 14, the amplification module 5 in accordance with this invention comprises two input optical fibers 8 and 9 on which optical signals (propagating from the left) having a wavelength $\lambda 1$ and $\lambda 2$, and optical signals (propagating from the right) having a wavelength $\lambda 3$ and $\lambda 4$ are carried, respectively. An end of optical fiber 8 is coupled to a port 2 of a first four-port optical circulator 12, and an end of optical fiber 9 is coupled to a port 3 of a second four-port optical circulator 14. An optical fiber having a Bragg diffraction grating therein is disposed between and coupled to the two circulators 12 and 14 in such a manner has to have one end optically coupled to port 3 of the first circulator 12 and to have the other end optically coupled to port 4 of the second optical circulator 14. In a somewhat similar fashion a second Bragg diffraction grating is disposed between the two circulators, however ends of the optical fiber containing the second grating are coupled to ports 1 and 2 of the first and second grating respectively. A single unidirectional path comprising an erbium doped optical amplifier 16 having optical fibers at each end is provided wherein the optical fiber ends are coupled to ports 4 and 1 of the first and second optical circulators 12 and 14 respectively. Thus, in operation light from port 4 of the first circulator propagates through the amplifier 16 to port 1 at the second circulator.

The Bragg fiber gratings 18a and 18b are both designed to reflect light of wavelengths $\lambda 1$ and $\lambda 2$, and to transmit light of wavelengths $\lambda 3$ and $\lambda 4$. A more detailed explanation of the input/output characteristics of the Bragg gratings is understood with reference to the plot shown in FIG. 14 depicting transmission versus wavelength. In this embodiment the requirements are such that $\lambda 1=1533\pm 4$ nm, $\lambda 2=1541\pm 2$ nm, $\lambda 3=1549\pm 2$ nm and $\lambda 4=1557\pm 4$ nm. Thus as the plot illustrates, wavelengths in the range of to 1529 to 1543 are substantially, and preferably, totally reflected, and wavelengths in the range of 1547 nm to 1551 nm are substantially, and preferably totally transmitted with no loss. Thus the Bragg grating (referred to hereafter as a Bragg filter) must be capable of reflecting a first signal having a first wavelength of light and transmitting a second optical signal that is within 4 nm difference from the first signal, in wavelength.

In an attempt to simplify and clearly describe the operation of the device in the absence of unnecessary detail, reference will be made to only a first optical signal and a second optical signal. Of course the first optical signal referred to can be of wavelength $\lambda 1$ or $\lambda 2$; and, the second optical signal can be of wavelength $\lambda 3$ or $\lambda 4$.

The first optical signal is launched into optical fiber 8 via an optical connector 19a. This signal enters the device 5 via port 2 of circulator 12 circulates to and exits port 3 directed toward the Bragg filter 18a. This first signal is reflected from the filter 18a backwards to port 3 and subsequently circulates to port 4 of the circulator 12. From port 4, the first signal propagates through the amplifier 16 and onward to port 1 of the second circulator 14. The amplified first signal then circulates to port 2 of 14, and is reflected backward (again to port 2) by the Bragg filter 18b. The amplified first signal then circulates from port 2 to port 3 and out of the second circulator 14 onto the optical fiber 9. Thus the first signal launched into the optical fiber 8, becomes amplified and is launched outward in a same direction onto optical fiber 9.

The second optical signal is launched into optical fiber 9 (in an opposite direction from the first signal) via an optical connector 19b. This second signal enters the device 5 via port 3 of circulator 14 and exits port 4 directed toward the Bragg filter 18a. Since the second signal is of wavelength $\lambda 3$ or $\lambda 4$, it is transmitted through the Bragg filter 18a and enters port 3 of the circulator 12. After passing from port 3 to port 4 of 12 the second signal is amplified by the amplifier 16 and passes from port 1 to port 2 of the second circulator 14. The second signal now amplified, is transmitted through the Bragg filter 18b and passes through the first circulator from port 1 to port 2 and out onto optical fiber 8 in its original direction, now as an amplified signal.

Advantageously, this implementation utilizing two optical circulators has additional and unexpected advantages. For example, if the second optical signal exiting port 2 of circulator 12 encounters a break in the fiber 8, or a poor connector 19a, unwanted reflections will result, and some light of the first signal will reflect backwards into the device 5. In this instance, the unwanted reflected light enters port 2 of 12 circulates to port 3, propagates through 18a and circulates to port 4 of circulator 14, where the light energy is extinguished. Similarly, if some of the amplified light energy of second signal reflects from 19b backward into the device, the light circulates from port 3 to port 4 of circulator 14; the light then propagates to the Bragg filter 18a where it is reflected back to port 4 of circulator 14. Once again, the reflections are extinguished at port 4.

Preferred embodiments of this invention require the use of optical fiber gratings, however, other elements having similar characteristics may be envisaged. For example, however less preferably, optical filters such as dichroic filters may be utilized in place of the Bragg filters, however the less than ideal isolation characteristics may be prohibitive.

Although the description heretofore relates primarily to an amplifying optical element, other unidirectional optical elements may replace the amplifying optical element and similar advantages may result in implementing this basic structure.

Figure 15:
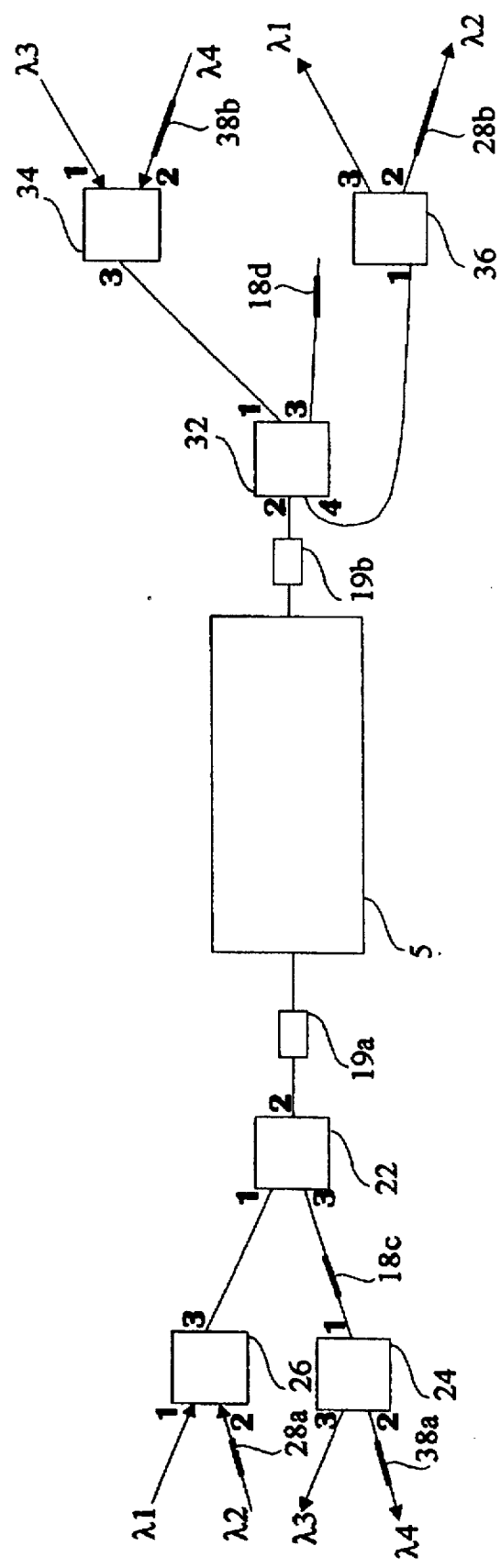
FIG. 15 is a detailed block diagram of a alternative embodiment of an optical system in accordance with this invention utilizing the bidirectional amplifier module shown in FIG. 13.
Figure 16:
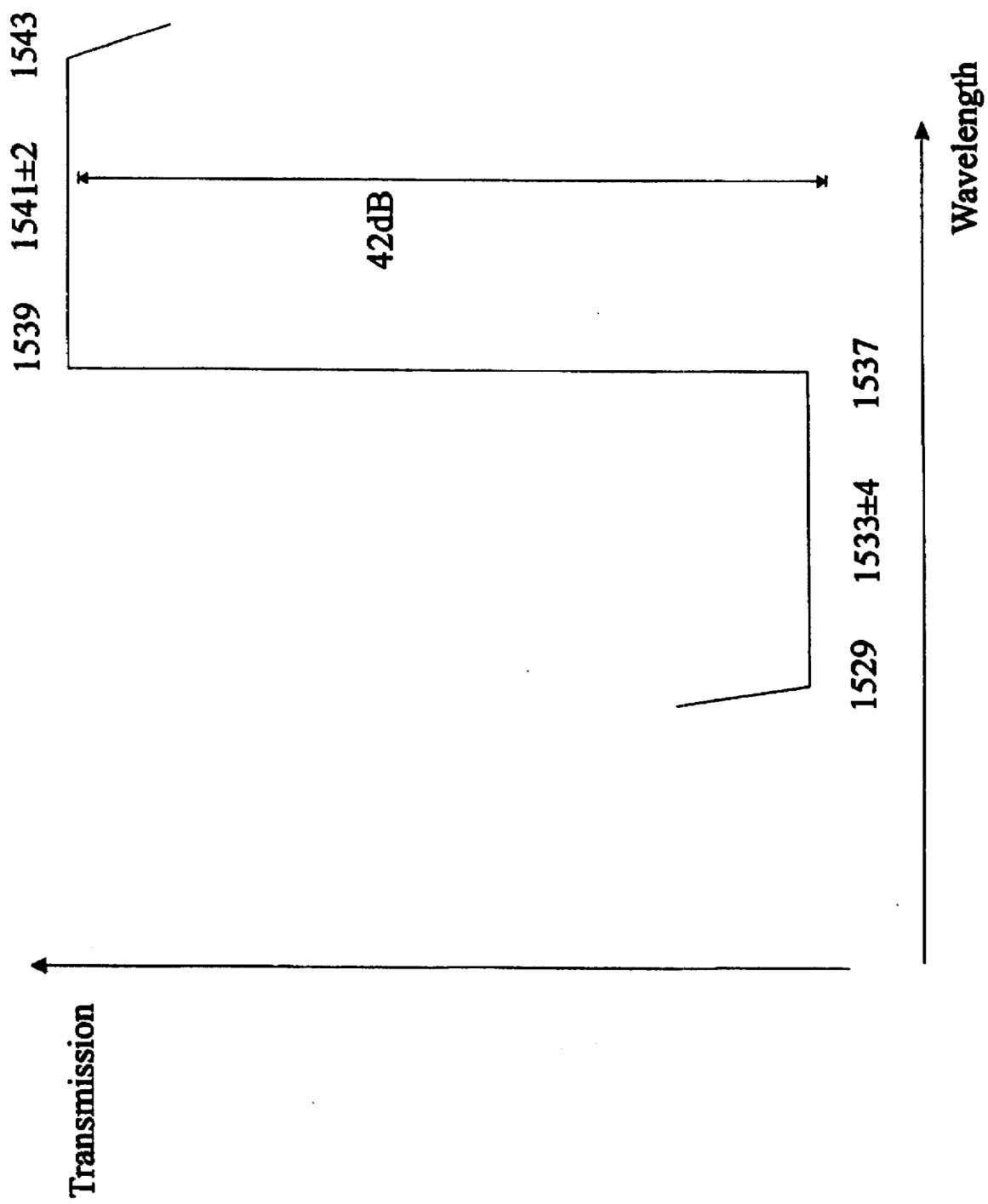
FIG. 16 is a plot of the transmissive/reflective characteristics of a second Bragg optical fiber grating.
Figure 17:
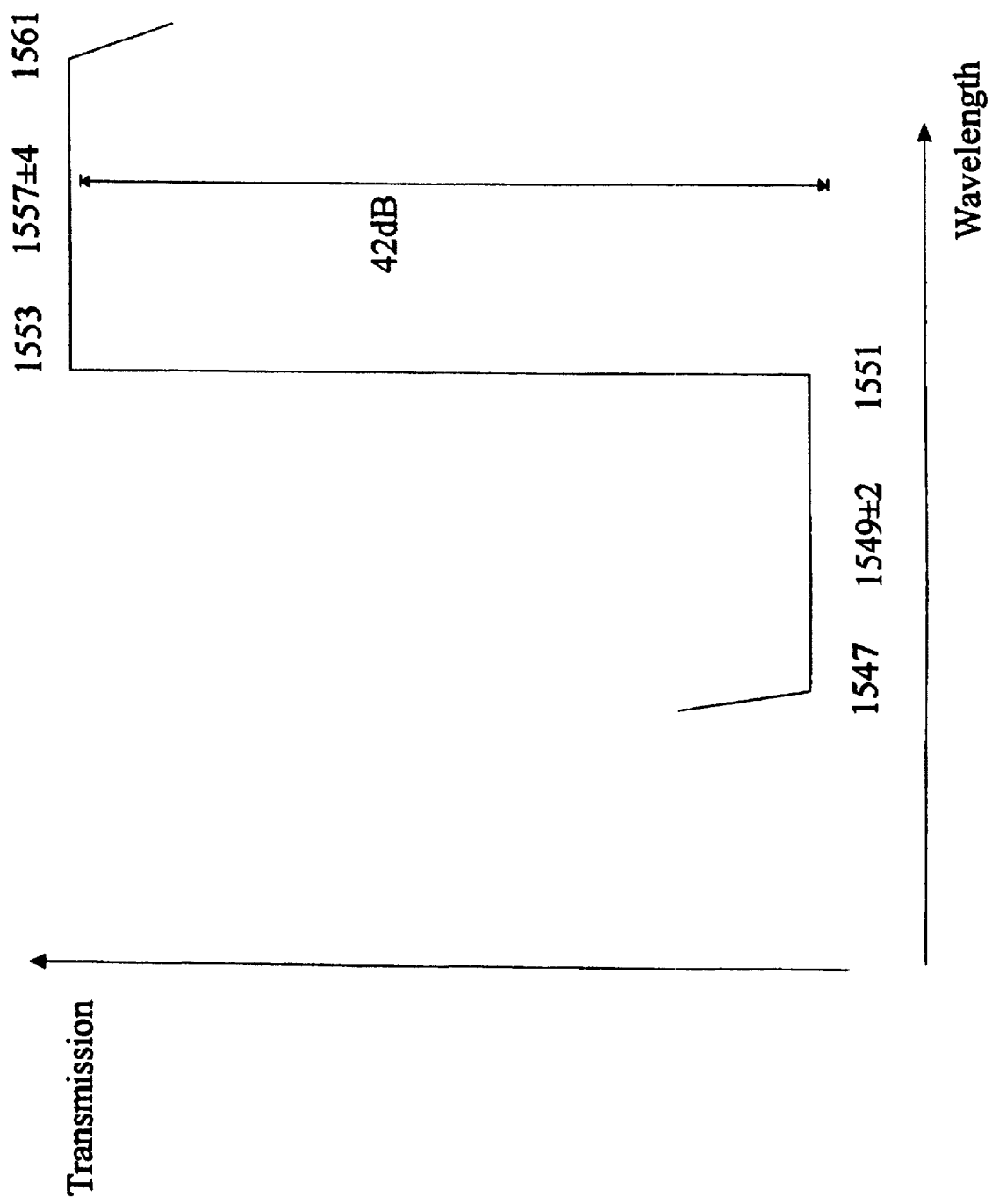
FIG. 17 is a plot of the transmissive/reflective characteristics of a third Bragg optical fiber grating.

Turning now to FIGS. 15, 16 and 17 an alternative and more complex embodiment of this invention will be described, that includes the basic device 5. This embodiment provides input and output terminals efficiently coupled to the device 5, for providing 4 separate optical signals of different wavelengths to be amplified by the single erbium-doped amplifier 16. The reflective/transmissive characteristics versus wavelength for the first group of Bragg optical fiber gratings referred to bearing the reference numerals 18c or 18d, are illustrated in FIG. 14. The reflective/transmissive characteristics versus wavelength for the second group of Bragg optical fiber gratings referred to bearing the reference numerals 28a or 28b, are illustrated in FIG. 16; and, The reflective/transmissive characteristics versus wavelength for the third group Bragg optical fiber gratings referred to bearing the reference numerals 38a or 38b, are illustrated in FIG. 17.

Three 3-port optical circulators 22, 24, and 26 are coupled to the left side of module 5 for directing input signals of wavelength λ1 and λ2 into the amplifying module 5 for amplification and for directing already amplified optical signals of wavelength λ3 and λ4 outward. A 4-port and two 3-port optical circulators are coupled to the right side of the amplifying module 5 via a connector 19b for directing amplified optical signals of wavelength λ1 and λ2 outward and for directing optical signals of wavelength λ3 and λ4 into the module 5.

The operation of the four wavelength amplifying optical system will now be described. An optical signal of wavelength λ1 is launched into a port 1 of the circulator 26 and circulates to port 2. The optical filter 28a reflects the signal of wavelength λ1 and it circulates from port 2 to port 3 of 26. The signal then circulates from port one to port 2 of circulator 22 and then propagates into the amplifying module 5. After being amplified the optical signal circulates from port 2 to port 3 of circulator 32 and is reflected backward by the optical filter 18d from port 3 to port 4. The signal then circulates from port 1 to port 2 of circulator 36 and is then reflected backward by 28b from port 2 to port 3 to reach its destination. Of course, Bragg fiber gratings 28a and 28b are designed to pass wavelength λ2 and to reflect light of wavelength λ1.

When light of wavelength λ2 is launched into the system it circulates from port 2 to port 3 of optical circulator 26. The light then circulates from port 1 to port 2 of 22 and then enters the amplifying module 5 via connector 19a. After being amplified, the light circulates from port 2 to port 3 of 32 and is reflected by the filter 18d back from port 3 to port 4 of 32. The amplified light of wavelength λ2 then circulates from port 1 to port 2 of circulator 36 and through grating 28b to reach its destination.

In the other direction (from right to left) an optical signal of wavelength λ3 is launched into port one of circulator 34 and passes to port 2 of the same device. The light is then reflected backward by Bragg grating 38b from port 2 to port 3 of 34. The light subsequently enters port 1 of 32 and then passes to port 2 and into the amplifying module 5. After being amplified, the optical signal passes outward from 5 through circulator 22 from port 2 to port 3. The light then passes from port 1 to port 2 of circulator 24 and is reflected back to port 2 by Bragg grating 38a and circulates from port 2 to port 3 of 24, and outward. Light of wavelength λ4 essentially follows a similar route, however it is launched into port 2 of 34 and circulates directly to port 3 following a same path to 5. After being amplified, this light follows a same path as the light of wavelength λ3, however is not reflected backward by 38a after circulating from port 1 to port 2 of 24. After propagating through 38a, the amplified light of wavelength λ4 propagates outward. The Bragg grating 18c advantageously provides a means of preventing any unwanted light of wavelength λ1 or λ2 reflected backward (i.e. from 19a) from reaching the output ports of λ3 or λ4.

Thus, the system shown in FIG. 15, provides a means for launching 4 separate signals of 4 different wavelengths, into the amplifying module 5, and provides 4 separate light conduits for receiving each of the 4 amplified signals.

Of course, numerous other embodiments may be envisaged without departing from the spirit and scope of the invention.

What is claimed is:

1. An amplifying device having two input/output ports comprising:
   (a) a first circulator having at least 4 ports;
   (b) a second circulator having at least 4 ports;
   (c) first wavelength selective means disposed between a first and a second port of the first and second circulator respectively;
   (d) second wavelength selective means disposed between a third and fourth port of the first and second circulator respectively, the first and second wavelength selective means substantially transmitting light of a first wavelength and substantially reflecting light of a second predetermined wavelength; and,
   (e) amplifying means, disposed between two other ports of the first and second circulators, said amplifying means being disposed along a path that is provided to carry light of first and second wavelength,
      the first and second circulators being arranged to receive two wavelengths of oppositely propagating light of at least the first and second wavelength and in cooperation with the first and second wavelength selective means and to direct the first and second oppositely propagating light in a same direction through the amplifying means,
   elements (a)–(e) constituting means for extinguishing reflections back into said input/output ports of normally outgoing optical signals without substantially interfering with light being processed in said device.

2. A device with two input/output ports for changing a characteristic of a first optical signal having wavelength, that is propagating in a first direction in a first optical fiber and for changing a same characteristic of a second optical signal, having a second wavelength that is propagating in a second direction along a second optical fiber, said device comprising:
   (a) a first multi-port optical circulator coupled to the first optical fiber to receive the first optical signal;
   (b) a second multi-port optical circulator coupled to the second optical fiber to receive the second optical signal;
   (c) wavelength selective means for substantially transmitting optical signals of the first wavelength and for substantially reflecting signals of the second wavelength, said wavelength selective means disposed between the first and second optical circulators; and,
   (d) means for changing a characteristic of an optical signal passing therethrough, said means disposed between and for communicating with said first and second optical circulator,
      the first and second multi-port optical circulators in combination with the wavelength selective means, cooperating to steer the first optical so that a characteristic of the first optical signal is changed onto the second optical fiber, and for later steering the first incoming signal onto the second optical fiber and for steering a second oppositely propagating optical signal so that a same characteristic of the second optical signal is changed, and for later steering the second signal onto the first optical fiber,
   elements (a)–(d) constituting means for extinguishing reflections back into said input/output ports of normally outgoing optical signals without substantially interfering with light being processed in said device.

3. The device as defined in claim 2 wherein the wavelength selective means are in the form of Bragg optical fiber difraction gratings.

4. The device as defined in claim 3, wherein the means for changing the characteristic of the optical signal passing therethrough is in the form of an optical amplifier.

5. A method of amplifying a first optical signal having a first wavelength propagating in a first direction at a first input/output port and amplifying a second optical signal having a second wavelength propagating in a second direction, at a second input/output port utilizing a same optical amplifier, comprising the steps of:

(a) routing the first and second optical signals to an input port of the optical amplifier through a first router;

(b) amplifying the first and second optical signals;

(c) rerouting the first optical signal in the first direction through a second router;

(d) rerouting the second optical signal in the second direction through the second router; and (e) extinguishing reflections back into said input/output ports of normally outgoing optical signals without substantially interfering with light being processed.

6. An optical amplifier arrangement having two input/output ports for amplifying a first optical signal having a first wavelength, propagating in a first direction and for amplifying a second optical signal, having a second wavelength propagating in a second direction, said arrangement comprising:

(a) means for directing the first and second optical signals in predetermined and opposite directions in dependence upon their wavelength;

(b) amplifying means for amplifying the first and second optical signals;

(c) a first router coupled to and in combination with said means for directing for routing the first and second optical signals to an input port of the optical amplifier; and, (d) a second router coupled to and in combination with said means for directing the first and second optical signals, for routing the first optical signal in the first direction and for routing the second optical signal in the second direction, elements (a)-(d) constituting means for extinguishing reflections back into said input/output ports of normally outgoing optical signals without substantially interfering with light being processed in said arrangement.

7. A device having two input/output ports for changing a characteristic of a first signal having a first wavelength, that is propagating in a first direction in a first optical fiber and for changing a same characteristic of a second optical signal, having a second wavelength that is propagating in a second direction along a second optical fiber, said device comprising:

(a) a first multi-port optical circulator coupled to the first optical fiber to receive the first optical signal;

(b) a second multi-port optical circulator coupled to the second optical fiber to receive the second optical signal;

(c) wavelength selective means for substantially transmitting optical signals of the first wavelength and for substantially reflecting signals of the second wavelength, said wavelength selective means disposed between the first and second optical circulators; and, (d) terminals for connection to means for changing a characteristic of an optical signal passing therethrough, said means for changing, when connected to said terminals, being disposed between and for communicating with said first and second optical circulator, the first and second multi-port optical circulators in combination with the wavelength selective means, cooperating to steer the first optical signal so that a characteristic of the first optical signal is changed, and for later steering the first incoming signal onto the second optical fiber, and for steering a second oppositely propagating optical signal so that a same characteristic of the second optical signal is changed, and for later steering the second signal onto the first optical fiber, elements (a)-(d) constituting means for extinguishing reflections back into said input/output ports of normally outgoing optical signals without substantially interfering with light being processed in said device.

8. An device having two input/output ports for use with an amplifier comprising:

(a) a first circulator having at least 4 ports;

(b) a second circulator having at least 4 ports;

(c) first wavelength selective means disposed between a first and second port of the first and second circulator respectively;

(d) second wavelength selective means disposed between a third and a fourth port of the first and second circulator respectively, the first and second wavelength selective means substantially transmitting light of a first wavelength and substantially reflecting light of a second predetermined wavelength;

(e) terminals disposed between two other ports of the first and second circulators for connection to amplifying means, said amplifying means, when connected to said terminals, being disposed along a path that is provided to carry light of the first and second wavelength, the first and second circulators being arranged to receive two wavelengths of oppositely propagating light of at least the fist and second wavelength and in cooperation with the first and second wavelength selective means, to direct the first and second oppositely propagating light in a same direction through the amplifying means, elements (a)-(e) constituting means for extinguishing reflections back into said input/output ports of normally outgoing optical signals without substantially interfering with light being processed in said device.

9. An amplifying device as defined in claim 1, comprising; circulator means coupled to one port of the first circulator and one port of the second circulator, for providing input and output ports to transmit at least four optical signals having different wavelengths of light into the amplifying device and for receiving the at least four optical signals separately after being amplified.

10. An amplifying device as defined in claim 1, wherein the wavelength selective means comprise optical gratings.

11. An amplifying device as defined in claim 10, wherein the gratings are Bragg optical fiber gratings.

12. An amplifying device as defined in claim 1, wherein the amplifying means is comprised of a rare earth doped optical amplifier absent isolation means.

* * * * *

UNITED STATES PATENT AND TRADEMARK OFFICE
CERTIFICATE OF CORRECTION

PATENT NO. : 5,748,363

DATED : May 5, 1998

INVENTOR(S) : Duck et al

It is certified that error appears in the above-identified patent and that said Letters Patent is hereby corrected as shown below:

In the first page, at number [73], the assignee should read – JDS Fitel Inc. –

Col. 2, line 49, "fight" should read – right –

Col. 3, line 34, "fight" should read – right –

Col. 15, line 3, "difraction" should read – diffraction –

Signed and Sealed this

Twenty-ninth Day of September, 1998

*Attest:*

BRUCE LEHMAN

*Attesting Officer*    *Commissioner of Patents and Trademarks*